US012759002B1

(12) United States Patent
Kondrup

(10) Patent No.: US 12,759,002 B1
(45) Date of Patent: Oct. 13, 2026

(54) HINGE LUBRICATION OVERSPRAY SHIELD

(71) Applicant: James Kondrup, Brandenton, FL (US)

(72) Inventor: James Kondrup, Brandenton, FL (US)

( * ) Notice: Subject to any disclaimer, the term of this patent is extended or adjusted under 35 U.S.C. 154(b) by 10 days.

(21) Appl. No.: 19/044,770

(22) Filed: Feb. 4, 2025

(51) Int. Cl.
*E05D 11/00* (2006.01)
*B05B 12/22* (2018.01)

(52) U.S. Cl.
CPC .......... *B05B 12/22* (2018.02); *E05D 11/0054* (2013.01)

(58) Field of Classification Search
CPC ................. E05D 11/06; E05D 11/0054; E05D 2011/0063; E05D 2011/0072; E05D 3/122; E05D 1/00; E05D 5/06; E05D 7/009; E05D 3/02; E05C 17/54; E05Y 2900/132; E05Y 2900/502; E05Y 2900/531; E05Y 2600/46; E05Y 2600/41; E05Y 2201/484; E05Y 2201/496; E05Y 2201/10; E05Y 2201/11; E05F 1/1215; B64C 1/1461; B05B 12/22; B05B 12/20; B05B 12/16; B05B 12/24; B05B 12/28; B05B 12/32; B05B 12/36
See application file for complete search history.

(56) References Cited

U.S. PATENT DOCUMENTS 1,386,706 A * 8/1921 Hall ........................ E04G 21/30 118/504
2,586,757 A * 2/1952 Wummel ................ E05D 11/06 16/377
2,693,785 A * 11/1954 West, Jr. ................ B44D 3/128 118/504
4,276,852 A * 7/1981 Adams .................... B05B 14/00 118/301
4,802,259 A 2/1989 Geslewitz
5,056,191 A 10/1991 Love
5,427,121 A * 6/1995 Polito .................. A45D 29/004 132/285
D392,855 S 3/1998 Pillow
D398,704 S 9/1998 Randle
6,735,821 B1 * 5/2004 Christman, Jr. .... E05D 11/0054 16/250
6,944,912 B1 * 9/2005 LeBeau ................... E05D 11/00 118/504

(Continued)

FOREIGN PATENT DOCUMENTS

DE 202013006120 U1 * 10/2013 ............. B05B 14/00
KR 102356086 B1 * 2/2022 ............... E05D 3/02
WO 2004072419 8/2004

*Primary Examiner* — Chuck Y Mah
(74) *Attorney, Agent, or Firm* — Kyle A. Fletcher, Esq.

(57) ABSTRACT

The hinge lubrication overspray shield is a protective barrier for use with a door hinge structure. The hinge lubrication overspray shield is also for use with an aerosol spray lubricant. The hinge lubrication overspray shield forms a protection space around the door hinge structure. The protection space formed by the hinge lubrication overspray shield captures and contains any excess aerosol spray lubricant within the protection space formed by the hinge lubrication overspray shield. The hinge lubrication overspray shield incorporates a superior plate structure, an inferior plate structure, and a collection structure. The superior plate structure and the inferior plate structure forms the protective barriers that enclose the protection space. The collection structure is a gravity fed reservoir that collects and contains the excess aerosol spray lubricant.

10 Claims, 8 Drawing Sheets

(56) References Cited

U.S. PATENT DOCUMENTS

| | | | | |
|---|---|---|---|---|
| 7,703,577 | B1 * | 4/2010 | Zach | E05D 11/02 184/104.1 |
| 9,988,833 | B2 | 6/2018 | Powell | |
| 10,603,682 | B1 | 3/2020 | Zalucki | |
| 11,220,851 | B2 * | 1/2022 | Conner, II | E05D 11/02 |
| 11,852,295 | B2 | 12/2023 | Conner | |
| 2002/0004103 | A1 * | 1/2002 | Lynch | B05D 1/32 427/468 |
| 2003/0213097 | A1 * | 11/2003 | Bowers | E05D 11/0054 16/250 |
| 2007/0084013 | A1 * | 4/2007 | Henrich | E05D 11/0054 16/258 |
| 2008/0276421 | A1 * | 11/2008 | Vanderpan | E05D 11/0054 16/250 |
| 2008/0295286 | A1 * | 12/2008 | Falato | E05D 11/0054 16/250 |
| 2012/0096633 | A1 * | 4/2012 | Escudero | E03D 9/00 4/300.3 |
| 2016/0076287 | A1 * | 3/2016 | Sandoval | E05D 11/0054 16/250 |
| 2016/0138703 | A1 * | 5/2016 | Doran | F16H 57/05 29/428 |
| 2017/0066007 | A1 * | 3/2017 | Brown | B05C 21/005 |
| 2020/0055069 | A1 * | 2/2020 | Andrews | B44D 2/007 |
| 2020/0055070 | A1 * | 2/2020 | Masalosalo | B05B 12/32 |
| 2020/0078810 | A1 * | 3/2020 | Zalucki | B65D 83/303 |
| 2022/0145681 | A1 * | 5/2022 | Hageman | E05F 5/06 |
| 2025/0067099 | A1 * | 2/2025 | Caron | E05D 11/02 |

* cited by examiner

HINGE LUBRICATION OVERSPRAY SHIELD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The hinge lubrication overspray shield is a protective barrier. The hinge lubrication overspray shield is configured for use with a door hinge structure. The hinge lubrication overspray shield is configured for use with an aerosol spray lubricant. The hinge lubrication overspray shield forms a protection space around the door hinge structure. The protection space formed by the hinge lubrication overspray shield captures and contains any excess aerosol spray lubricant within the protection space formed by the hinge lubrication overspray shield. The hinge lubrication overspray shield comprises a superior plate structure, an inferior plate structure, and a collection structure. The superior plate structure and the inferior plate structure forms the protective barriers that enclose the protection space. The collection structure is a gravity fed reservoir that collects and contains the excess aerosol spray lubricant.

These together with additional objects, features and advantages of the hinge lubrication overspray shield will be readily apparent to those of ordinary skill in the art upon reading the following detailed description of the presently preferred, but nonetheless illustrative, embodiments when taken in conjunction with the accompanying drawings.

In this respect, before explaining the current embodiments of the hinge lubrication overspray shield in detail, it is to be understood that the hinge lubrication overspray shield is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hinge lubrication overspray shield.

It is therefore important that the claims be regarded as including such equivalent construction insofar as they do not depart from the spirit and scope of the hinge lubrication overspray shield. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
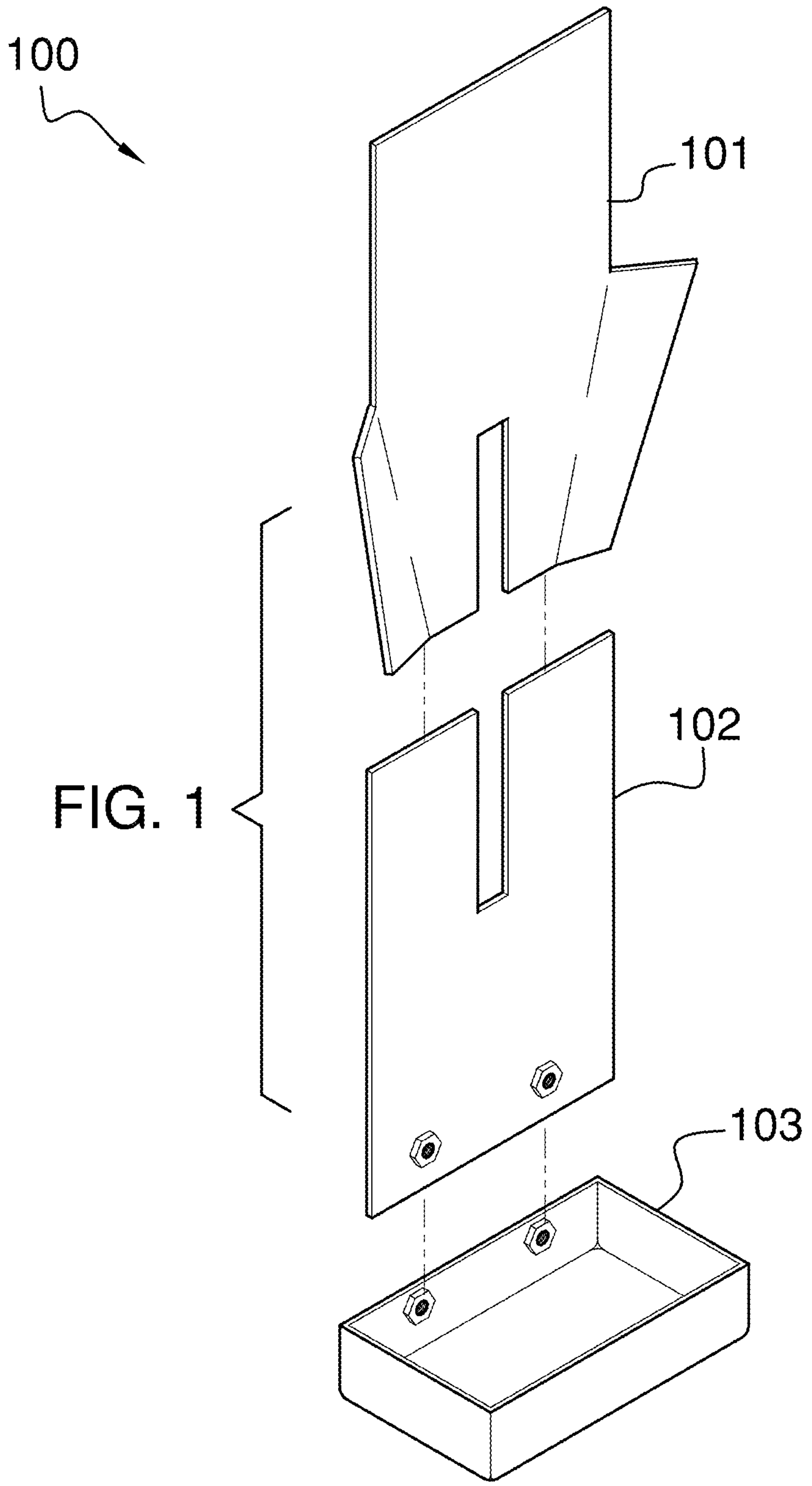
FIG. 1 is an exploded view of an embodiment of the disclosure.
Figure 2:
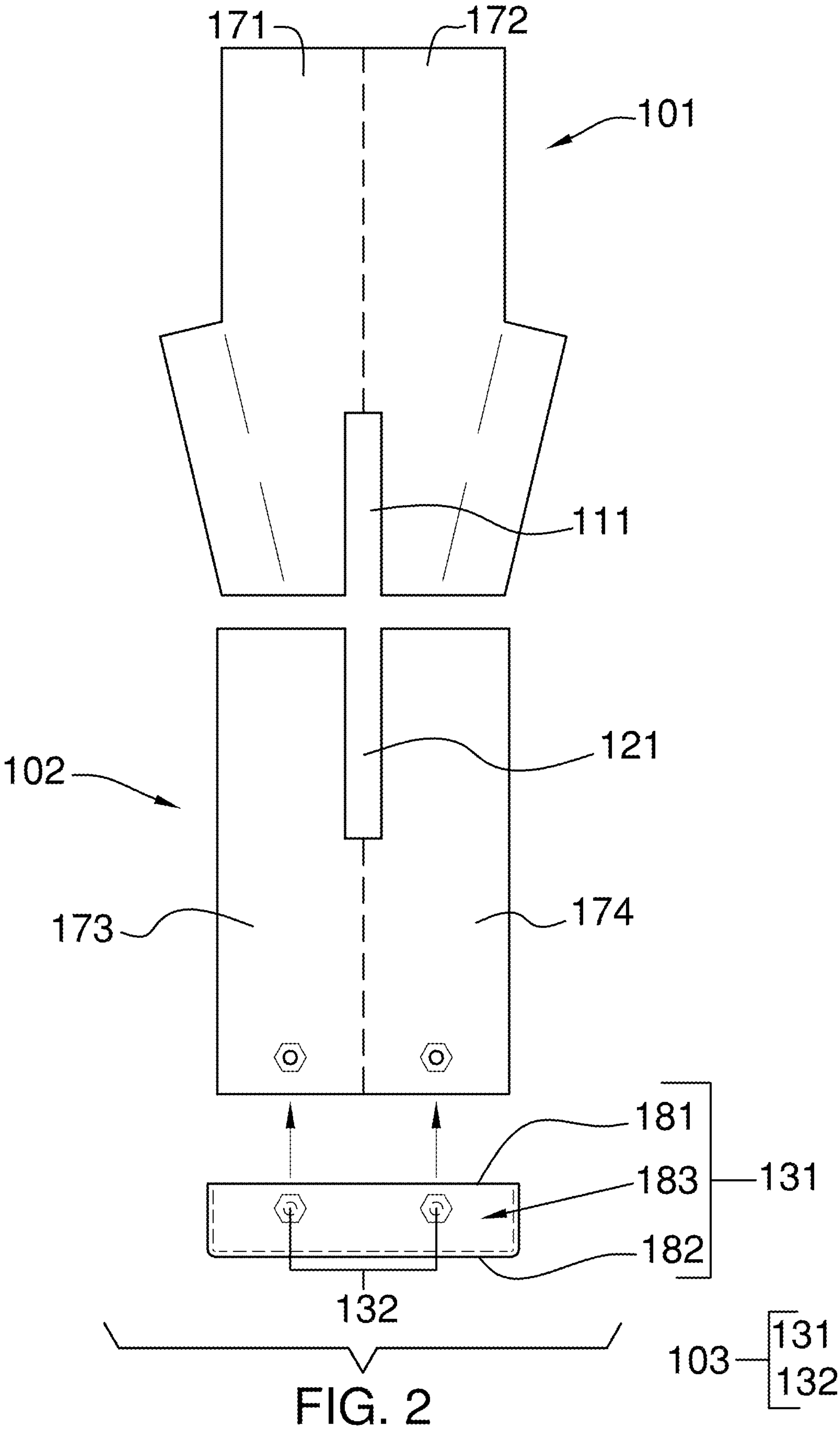
FIG. 2 is a front view of an embodiment of the disclosure.
Figure 3:
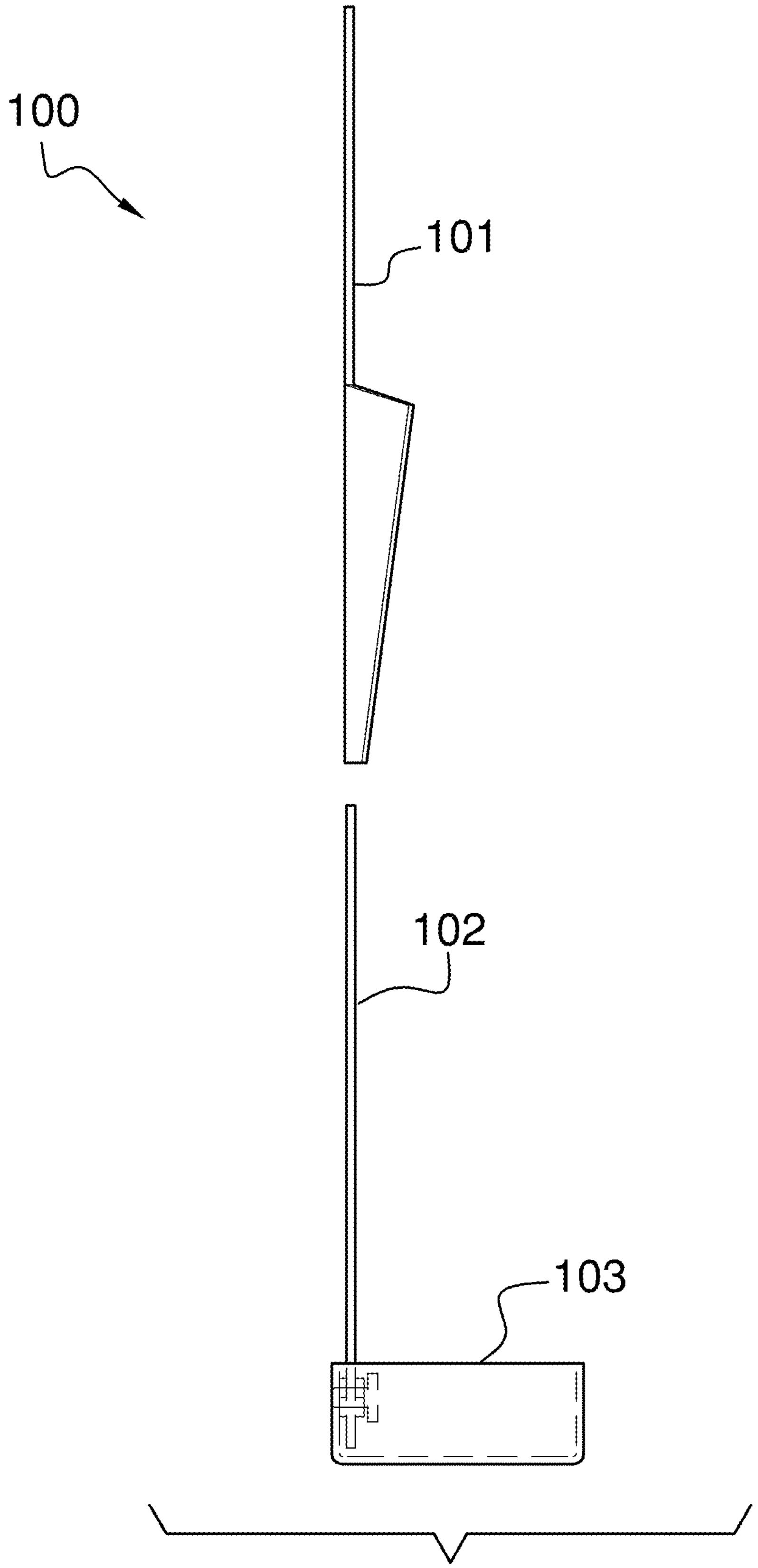
FIG. 3 is a side view of an embodiment of the disclosure.
Figure 4:
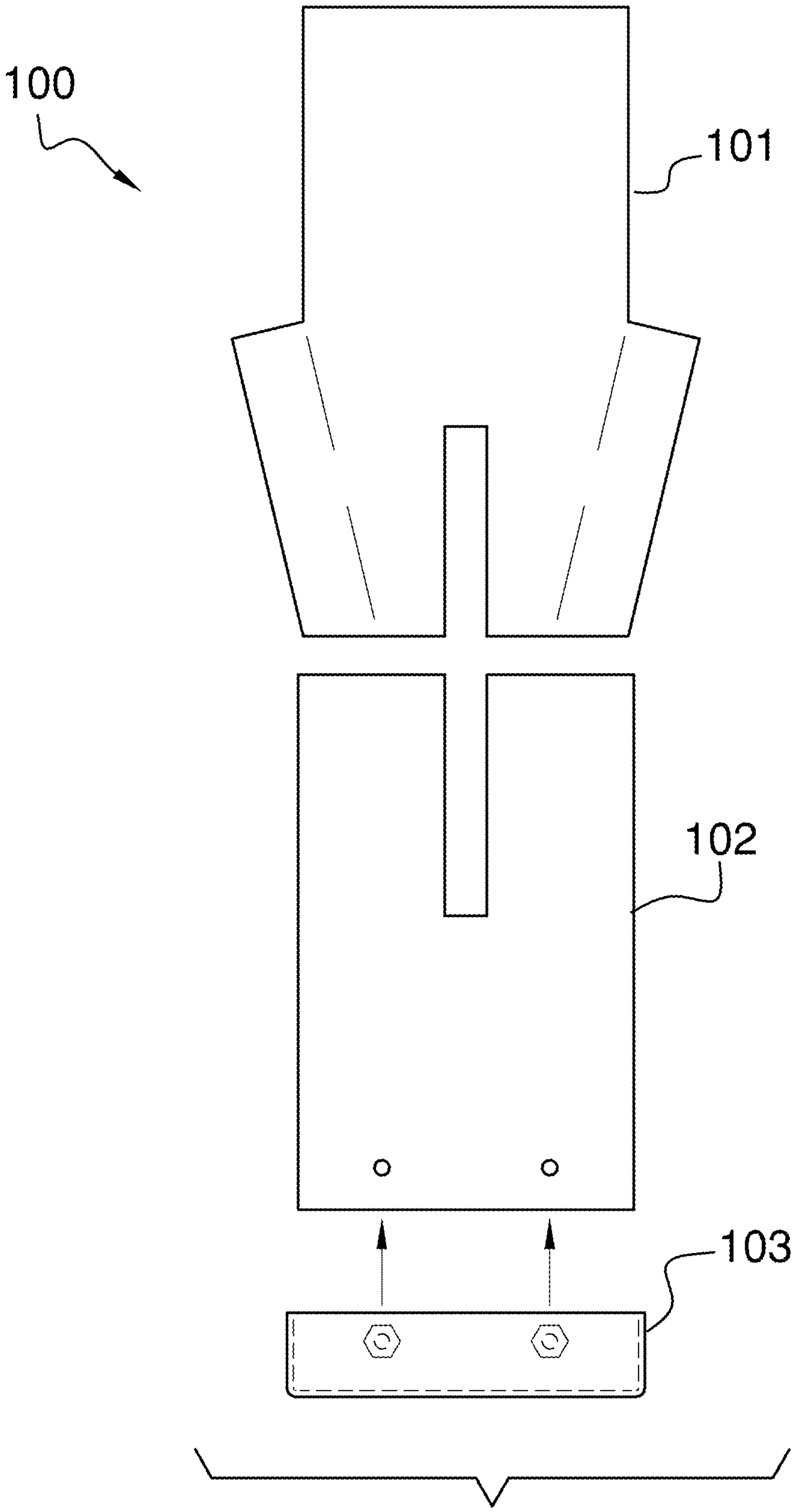
FIG. 4 is a rear view of an embodiment of the disclosure.
Figure 5:
Figure 6:
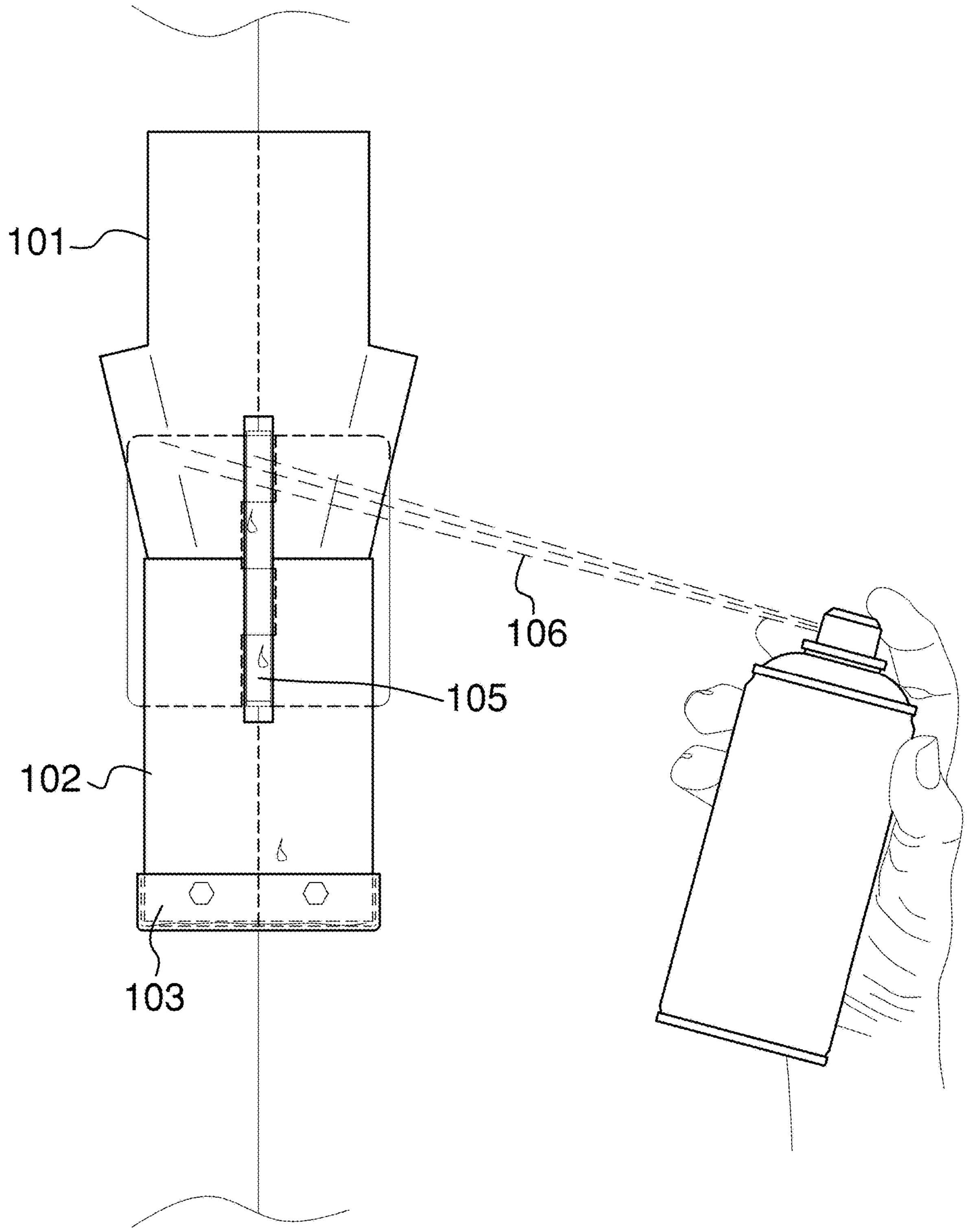
FIG. 6 is an in-use view of an embodiment of the disclosure.
Figure 7:
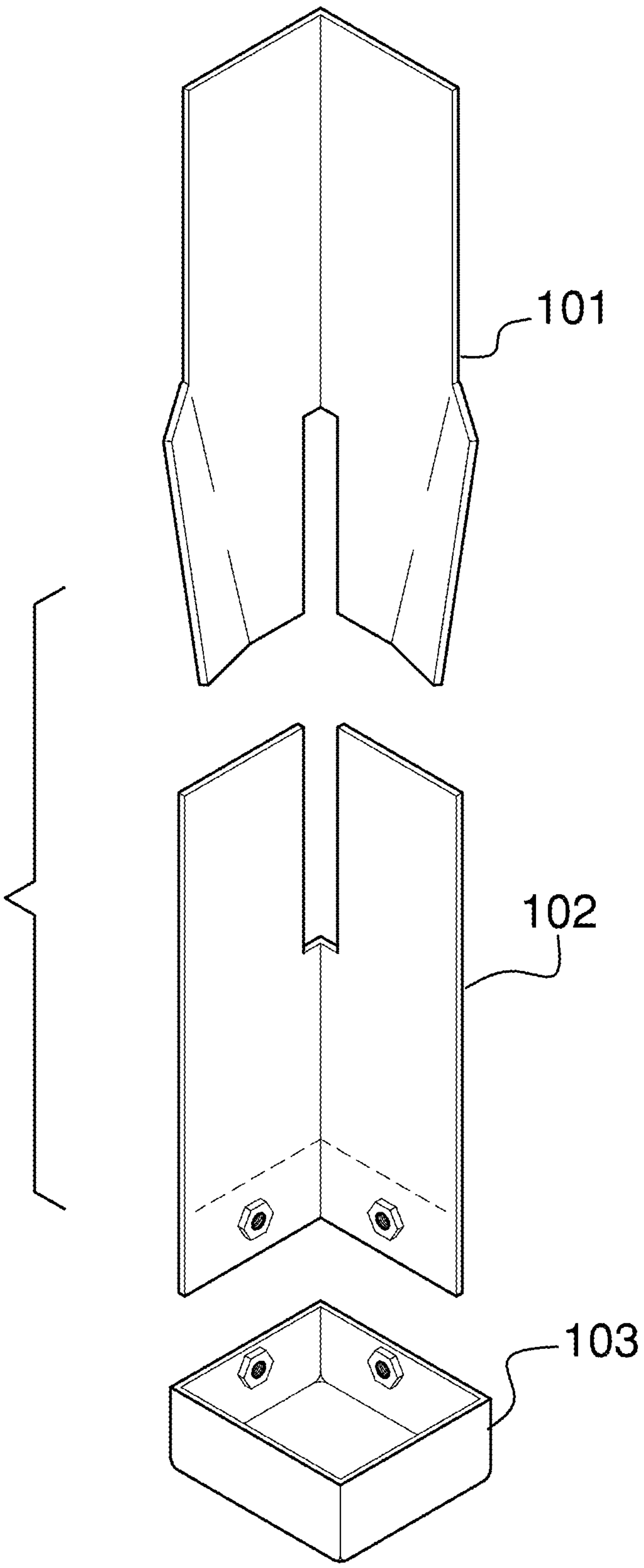
FIG. 7 is an exploded view of an alternate embodiment of the disclosure.
Figure 8:
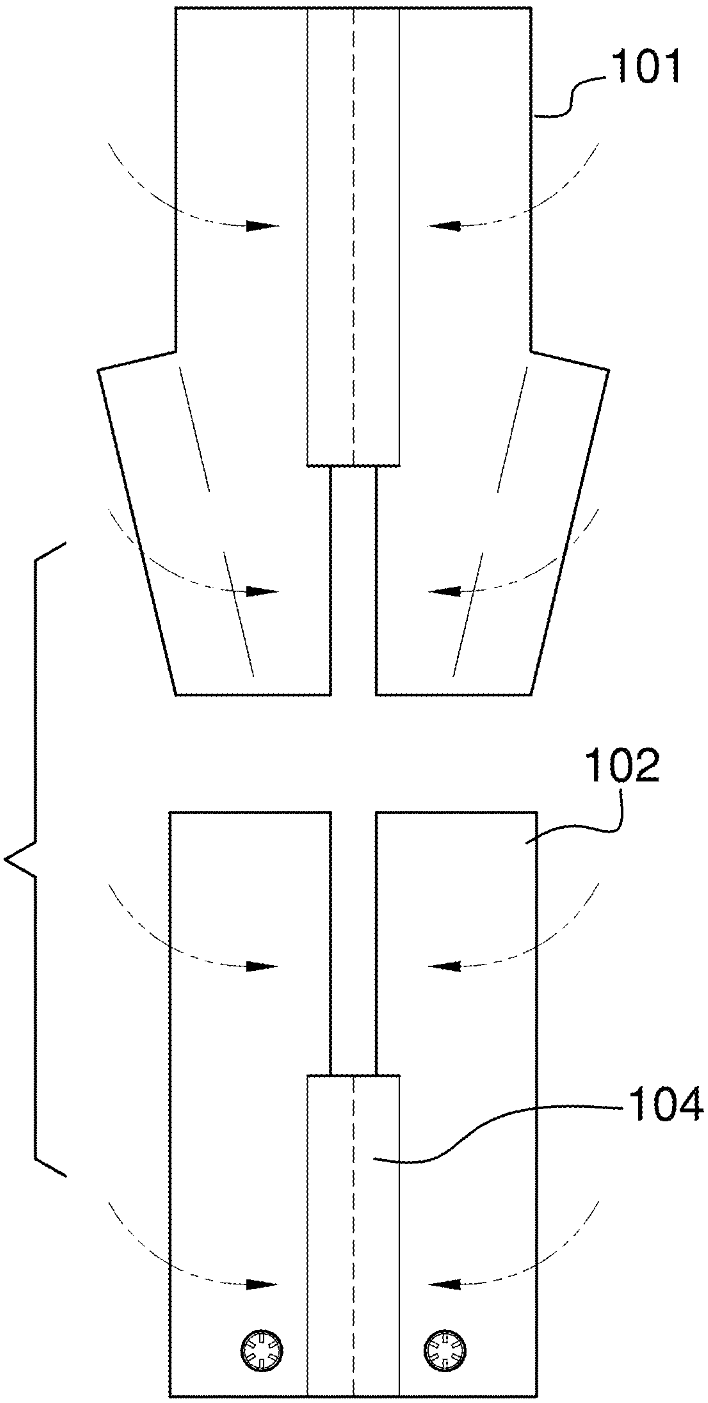
FIG. 8 is a rear view of an alternate embodiment of the disclosure.

Detailed reference will now be made to one or more potential embodiments of the disclosure, which are illustrated in FIGS. 1 through 8.

The hinge lubrication overspray shield 100 (hereinafter invention) is a protective barrier. The invention 100 is configured for use with a door hinge structure 105. The invention 100 is configured for use with an aerosol spray lubricant 106. The invention 100 forms a protection space around the door hinge structure 105. The protection space formed by the invention 100 captures and contains any excess aerosol spray lubricant 106 within the protection space formed by the invention 100. The invention 100 comprises a superior plate structure 101, an inferior plate structure 102, and a collection structure 103. The superior plate structure 101 and the inferior plate structure 102 forms the protective barriers that enclose the protection space. The collection structure 103 is a gravity fed reservoir that collects and contains the excess aerosol spray lubricant 106.

The door hinge structure 105 is a hinge. The door hinge structure 105 is used to secure a door to a horizontally oriented surface. The door hinge structure 105 is a rotating structure. The door hinge structure 105 forms the structure that allows the door to rotate around a vertically oriented axis of rotation. The door hinge structure 105 requires maintenance in the form of applying a lubricant. The aerosol spray lubricant 106 is the lubricant that is applied to the door hinge structure 105 during maintenance activities. The aerosol spray lubricant 106 is applied to the door hinge structure 105 as a colloidal suspension.

The superior plate structure 101 is a disk shaped structure. The superior plate structure 101 is formed from a fluid impermeable material. The structure of the superior plate structure 101 is selected from the group consisting of: a) a lateral disk structure; and, b) an offset lateral disk structure. The form factor of the superior plate structure 101 is selected such that the superior plate structure 101 fits around the door hinge structure 105. The superior plate structure 101 forms the superior portion of the protection space formed by the invention 100. The superior plate structure 101 forms a protective barrier that contains the aerosol spray lubricant 106 within the protection space formed by the invention 100. The superior plate structure 101 comprises a first wing plate 171, a second wing plate 172, and a superior hinge notch 111.

The first wing plate 171 is a disk shaped structure. The first wing plate 171 is formed from a fluid impermeable material. The first wing plate 171 is selected from the group consisting of: a) a lateral disk structure; and, b) an offset lateral disk structure. The first wing plate 171 attaches to the second wing plate 172 to form the superior plate structure 101. The first wing plate 171 forms a first lateral edge of the disk shape of the superior plate structure 101.

The second wing plate 172 is a disk shaped structure. The second wing plate 172 is formed from a fluid impermeable material. The second wing plate 172 is selected from the group consisting of: a) a lateral disk structure; and, b) an offset lateral disk structure. The second wing plate 172 attaches to the first wing plate 171 to form the superior plate structure 101. The second wing plate 172 forms a second lateral edge of the disk shape of the superior plate structure 101.

The superior hinge notch 111 is a negative space that is formed through the congruent ends of the disk structure of the superior plate structure 101. The superior hinge notch 111 is sized such that the door hinge structure 105 inserts through the superior hinge notch 111 when the superior hinge notch 111 forms a portion of the protection space around the door hinge structure 105.

The inferior plate structure 102 is a disk shaped structure. The inferior plate structure 102 is formed from a fluid impermeable material. The structure of the inferior plate structure 102 is selected from the group consisting of: a) a lateral disk structure; and, b) an offset lateral disk structure. The form factor of the inferior plate structure 102 is selected such that the inferior plate structure 102 fits around the door hinge structure 105. The inferior plate structure 102 forms the inferior portion of the protection space formed by the invention 100. The inferior plate structure 102 forms a protective barrier that contains the aerosol spray lubricant 106 within the protection space formed by the invention 100. The inferior plate structure 102 comprises a third wing plate 173, a fourth wing plate 174, and an inferior hinge notch 121.

The inferior hinge notch 121 is a negative space that is formed through the congruent ends of the disk structure of the superior plate structure 101. The inferior hinge notch 121 is sized such that the door hinge structure 105 inserts through the inferior hinge notch 121 when the inferior hinge notch 121 forms the balance of the protection space around the door hinge structure 105.

The third wing plate 173 is a disk shaped structure. The third wing plate 173 is formed from a fluid impermeable material. The third wing plate 173 is selected from the group consisting of: a) a lateral disk structure; and, b) an offset lateral disk structure. The third wing plate 173 attaches to the fourth wing plate 174 to form the inferior plate structure 102. The third wing plate 173 forms a third lateral edge of the disk shape of the inferior plate structure 102.

The fourth wing plate 174 is a disk shaped structure. The fourth wing plate 174 is formed from a fluid impermeable material. The fourth wing plate 174 is selected from the group consisting of: a) a lateral disk structure; and, b) an offset lateral disk structure. The fourth wing plate 174 attaches to the third wing plate 173 to form the inferior plate structure 102. The fourth wing plate 174 forms a fourth lateral edge of the disk shape of the inferior plate structure 102.

The collection structure 103 is a fluid impermeable structure. The collection structure 103 is a pan shaped structure. The collection structure 103 forms the inferior structure of the invention 100. The collection structure 103 forms a collection reservoir. The collection structure 103 collects the excess aerosol spray lubricant 106 that flows down the superior plate structure 101 and the inferior plate structure 102. The collection structure 103 attaches to the inferior plate structure 102. The collection structure 103 comprises a pan structure 131 and a fastening structure 132.

The pan structure 131 forms the primary shape of the collection structure 103. The pan structure 131 forms the collection reservoir of the collection structure 103. The pan structure 131 receives and stores the excess aerosol spray lubricant 106 in anticipation of subsequent disposal. The pan structure 131 further comprises an open face structure 181, a closed face structure 182, and a plurality of lateral face structures 183.

The open face structure 181 forms the open face of the pan structure 131. The open face structure 181 forms the superior face of the pan structure 131.

The closed face structure 182 forms the closed face of the pan structure 131. The closed face structure 182 forms the inferior face of the pan structure 131. The closed face structure 182 forms the face of the pan structure 131 that is distal from the open face structure 181. The closed face structure 182 forms a horizontally oriented containment surface of the pan structure 131.

The plurality of lateral face structures 183 forms the lateral face structure of the pan structure 131. The plurality of lateral face structures 183 forms a vertically oriented containment surfaces of the pan structure 131.

The fastening structure 132 is a fastening device. The fastening structure 132 forms the mechanical structure that secures one or more lateral faces selected from the plurality of lateral face structures 183 of the pan structure 131 to the inferior plate structure 102.

In a second potential embodiment of the disclosure, the inferior plate structure 102 further comprises a living hinge structure 104. The living hinge structure 104 is a living hinge. The living hinge is defined elsewhere in this disclosure. The living hinge structure 104 attaches the third wing plate 173 to the fourth wing plate 174 such that the third wing plate 173 rotates relative to the fourth wing plate 174.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space or surface and a second space or surface. The barrier prevents the passage of an object between the first space and the second space.

Boundary Structure: As used in this disclosure, a boundary structure is a barrier that separates a first object from a second object such that the second object cannot damage the first object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center, Major, Minor, and Thickness Dimensions: As used in this disclosure, the center dimension, the major dimension, the minor dimension, and the thickness each refer to the span of a length associated with a structure selected from the group consisting of a prism structure and a disk structure. The center dimension is the span of the length of the center axis of the selected structure. The thickness is an alternate name given to the center dimension when the selected structure is a disk structure. The major dimension is the span of the length of the major axis of the perimetrical boundary that contains the selected structure. The minor dimension is the span of the length of the minor axis of the perimetrical boundary that contains the selected structure. The terms center dimension, the major dimension, the minor dimension, and the thickness are also used to describe one or more linear axes of direction associated with the selected structure.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clamshell: As used in this disclosure, clamshell refers to a hollow containment structure from a first structure and a second structure such that: 1) a hinge joins the first structure and the second structure; and, 2) the second structure is oriented to the first structure such that the first structure and the second structure form a mirror image.

Colloidal Suspension: As used in this disclosure, a colloidal suspension, or colloid for short, is a heterogeneous mixture of solute particles dissolved in a solvent. The colloidal suspension is referred to as heterogeneous because the distribution of the solute particles is not uniform through the solvent, usually because of the relatively large size of the particles. When the solvent is a gas, a colloidal suspension is often referred to as an aerosol.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Deformation: As used in this disclosure, the term deformation refers to the application of a force to an object such that the form factor of the object is changed. The infinitive form of deformation is "to deform." An object can be elastically deformed and inelastically deformed. The elastically deformed object will return to its original shape (the relaxed shape) when the deforming force is removed. The inelastically deformed object will not return to its original shape when the deforming force is removed.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Flexible: As used in this disclosure, flexible refers to an object or material that will deform when a force is applied to it but that will not necessarily return to its original shape when the deforming force is removed.

Flexure Bearing: As used in this disclosure, a flexure bearing is a thin and flexible material that is used to attach, or bind, a first object to a second object such that the first object can rotate in a controlled direction relative to the second object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Living Hinge: As used in this disclosure, a living hinge refers to a single object that is formed out of flexible material that is divided into a first segment, a second segment and the living hinge. The flexible nature of the flexible material allows the living hinge to be flexed in the manner of a hinge allowing the first segment to rotate relative to the second hinge. The living hinge is a form of a flexure bearing. A material that is formed with a series of parallel living hinges is referred to as a kerf bending. A kerf bending formed in a plate allows the plate to be bent into a curved shape.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load of an Object: As used in this disclosure, the term load of an object refers to an object that is inserted into a load path. The load of an object refers to the sum of the 14 forces (including the force of gravity) that are applied to the object.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Negative Space: As used in this disclosure, negative space is a method of defining an object through the use of open or empty space as the definition of the object itself, or, through the use of open or empty space to describe the boundaries of an object.

Notch: As used in this disclosure, a notch is: 1) an indentation or negative space formed in an edge; or 2) a cavity or aperture formed within a surface.

Offset Lateral Disk Structure: As used in this disclosure, an offset lateral disk structure refers to the juxtaposition of a first lateral face of a first disk structure to a second lateral face of a second disk structure in the manner of a lateral disk structure except that one or more of the following conditions need not be true: a) the center axes of the first disk structure and the second disk structure are no longer parallel; and, b) the congruent ends of the first disk structure are no longer parallel to the congruent ends of the second disk structure.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Pivot: As used in this disclosure, a pivot is a rod or shaft around which an object rotates or swings.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the 23 object; c) protects the object within the protected space from potential dangers that are outside of the protected space; or, d) maintains the privacy of the object within the protected space.

Protective Barrier: As used in this disclosure, a protected barrier is a boundary structure. The boundary structure forms a barrier that separates a first object from a second object such that the second object cannot damage the first object.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Semi-Rigid Structure: As used in this disclosure, a semi-rigid structure is a solid structure that is stiff but not wholly inflexible and that will deform under force before breaking. A semi-rigid structure may or may not behave with 23 an elastic nature in that a semi-rigid structure need not return to its relaxed shape.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Spring: As used in this disclosure, a spring is a device 8 that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A hinge lubrication overspray shield comprising a superior plate structure, an inferior plate structure, and a collection structure;

wherein the superior plate structure and the inferior plate structure forms a protective barrier that enclose a protection space;

wherein the collection structure is a gravity fed reservoir;

wherein the protection space formed by the hinge lubrication overspray shield captures and contains any excess aerosol spray lubricant within the protection space formed by the hinge lubrication overspray shield;

wherein the superior plate structure comprises a first wing plate, a second wing plate, and a superior hinge notch;

wherein the first wing plate attaches to the second wing plate to form the superior plate structure;

wherein the first wing plate forms a first lateral edge of the superior plate structure;

wherein the second wing plate attaches to the first wing plate to form the superior plate structure;

wherein the second wing plate forms a second lateral edge of the superior plate structure;

wherein the superior hinge notch is a negative space that is formed through the congruent ends of the superior plate structure;

wherein the superior hinge notch is sized such that the door hinge structure inserts through the superior hinge notch when the superior hinge notch forms a portion of the protection space around the door hinge structure.

2. The hinge lubrication overspray shield according to claim 1 wherein the hinge lubrication overspray shield is configured for use with a door hinge structure;

wherein the hinge lubrication overspray shield is configured for use with an aerosol spray lubricant;

wherein the hinge lubrication overspray shield forms the protection space around the door hinge structure;

wherein the collection structure is a gravity fed reservoir that collects and contains the excess aerosol spray lubricant.

3. The hinge lubrication overspray shield according to claim 2 wherein the superior plate structure is a disk shaped structure;

wherein the superior plate structure is formed from a fluid impermeable material;

wherein the structure of the superior plate structure is selected from the group consisting of: a) a lateral disk structure; and, b) an offset lateral disk structure;

wherein the form factor of the superior plate structure is selected such that the superior plate structure fits around the door hinge structure;

wherein the superior plate structure forms the superior portion of the protection space formed by the hinge lubrication overspray shield;

wherein the superior plate structure forms a protective barrier that contains the aerosol spray lubricant within the protection space formed by the hinge lubrication overspray shield.

4. The hinge lubrication overspray shield according to claim 3 wherein the inferior plate structure is a disk shaped structure;

wherein the inferior plate structure is formed from a fluid impermeable material;

wherein the structure of the inferior plate structure is selected from the group consisting of: a) a lateral disk structure; and, b) an offset lateral disk structure;

wherein the form factor of the inferior plate structure is selected such that the inferior plate structure fits around the door hinge structure;

wherein the inferior plate structure forms the inferior portion of the protection space formed by the hinge lubrication overspray shield;

wherein the inferior plate structure forms a protective barrier that contains the aerosol spray lubricant within the protection space formed by the hinge lubrication overspray shield.

5. The hinge lubrication overspray shield according to claim 4 wherein the collection structure is a fluid impermeable structure;

wherein the collection structure is a pan shaped structure;

wherein the collection structure forms the inferior structure of the hinge lubrication overspray shield;

wherein the collection structure forms a collection reservoir;

wherein the collection structure collects the excess aerosol spray lubricant that flows down the superior plate structure and the inferior plate structure;

wherein the collection structure attaches to the inferior plate structure.

6. The hinge lubrication overspray shield according to claim 5 wherein the first wing plate is a disk shaped structure;

wherein the first wing plate is formed from a fluid impermeable material;

wherein the first wing plate is selected from the group consisting of: a) a lateral disk structure; and, b) an offset lateral disk structure;

wherein the second wing plate is a disk shaped structure;

wherein the second wing plate is formed from a fluid impermeable material;

wherein the second wing plate is selected from the group consisting of: a) a lateral disk structure; and, b) an offset lateral disk structure.

7. The hinge lubrication overspray shield according to claim 6 wherein the inferior plate structure comprises a third wing plate, a fourth wing plate, and an inferior hinge notch;

wherein the inferior hinge notch is a negative space that is formed through the congruent ends of the disk structure of the superior plate structure;

wherein the inferior hinge notch is sized such that the door hinge structure inserts through the inferior hinge notch when the inferior hinge notch forms the balance of the protection space around the door hinge structure;

wherein the third wing plate is a disk shaped structure;

wherein the third wing plate is formed from a fluid impermeable material;

wherein the third wing plate is selected from the group consisting of: a) a lateral disk structure; and, b) an offset lateral disk structure;

wherein the third wing plate attaches to the fourth wing plate to form the inferior plate structure;

wherein the third wing plate forms a third lateral edge of the disk shape of the inferior plate structure;

wherein the fourth wing plate is a disk shaped structure;

wherein the fourth wing plate is formed from a fluid impermeable material;

wherein the fourth wing plate is selected from the group consisting of: a) a lateral disk structure; and, b) an offset lateral disk structure;

wherein the fourth wing plate attaches to the third wing plate to form the inferior plate structure;

wherein the fourth wing plate forms a fourth lateral edge of the disk shape of the inferior plate structure.

8. The hinge lubrication overspray shield according to claim 7 wherein the collection structure comprises a pan structure;

wherein the pan structure forms the primary shape of the collection structure;

wherein the pan structure forms the collection reservoir of the collection structure;

wherein the pan structure receives and stores the excess aerosol spray lubricant in anticipation of subsequent disposal;

wherein the pan structure further comprises an open face structure, a closed face structure, and a plurality of lateral face structures;

wherein the open face structure forms the open face of the pan structure;

wherein the open face structure forms the superior face of the pan structure;

wherein the closed face structure forms the closed face of the pan structure;

wherein the closed face structure forms the inferior face of the pan structure;

wherein the closed face structure forms the face of the pan structure that is distal from the open face structure;

wherein the closed face structure forms a horizontally oriented containment surface of the pan structure;

wherein the plurality of lateral face structures forms the lateral face structure of the pan structure;

wherein the plurality of lateral face structures forms a vertically oriented containment surfaces of the pan structure.

9. The hinge lubrication overspray shield according to claim 8 wherein the collection structure comprises a fastening structure;

wherein the fastening structure is a fastening device;

wherein the fastening structure forms the mechanical structure that secures one or more lateral faces selected from the plurality of lateral face structures of the pan structure to the inferior plate structure.

10. The hinge lubrication overspray shield according to claim 9 wherein the inferior plate structure further comprises a living hinge structure;

wherein the living hinge structure is a living hinge;

wherein the living hinge structure attaches the third wing plate to the fourth wing plate such that the third wing plate rotates relative to the fourth wing plate.

* * * * *